Oct. 11, 1927.

B. GREGORY ET AL 1,645,480

AUTOMATIC TRIP VALVE FOR STORAGE TANKS

Filed April 26, 1926

Bige Gregory
C.C. Mitchell
Inventors

By John M Stellman
Attorney

Patented Oct. 11, 1927.

1,645,480

UNITED STATES PATENT OFFICE.

BIGE GREGORY AND CLARENCE C. MITCHELL, OF VERNON, TEXAS, ASSIGNORS OF THREE-SIXTEENTHS TO JESS LOVE, THREE-SIXTEENTHS TO E. L. ISHAM, AND ONE-FOURTH TO CHARLIE THRASHER, ALL OF WILBARGER COUNTY, TEXAS.

AUTOMATIC TRIP VALVE FOR STORAGE TANKS.

Application filed April 26, 1926. Serial No. 104,667.

This invention relates to improvements in valves and it relates more particularly to automatic valves.

The primary object of the invention is to provide an automatic valve for use in filling oil storage tanks. Usually when a number of tanks are to be filled an operator must be present to close the intake valve and the object of the invention is to provide a valve to be affixed to each of a plurality of oil storage tanks, the operation of the valve being such that when a tank is filled with oil the valve will automatically close and permit the oil to flow through the device to the next tank.

The invention further includes the application of a valve to each of a series or plurality of tanks, the tanks to be connected to each other by a pipe, so that when one tank is filled, the valve will automatically close the filled tank and permit the liquid to flow to the next tank, and continuing until the battery of tanks are filled.

The invention will be better understood from a perusal of the following description, in connection with the accompanying drawings and wherein—

Figures 1, 2:
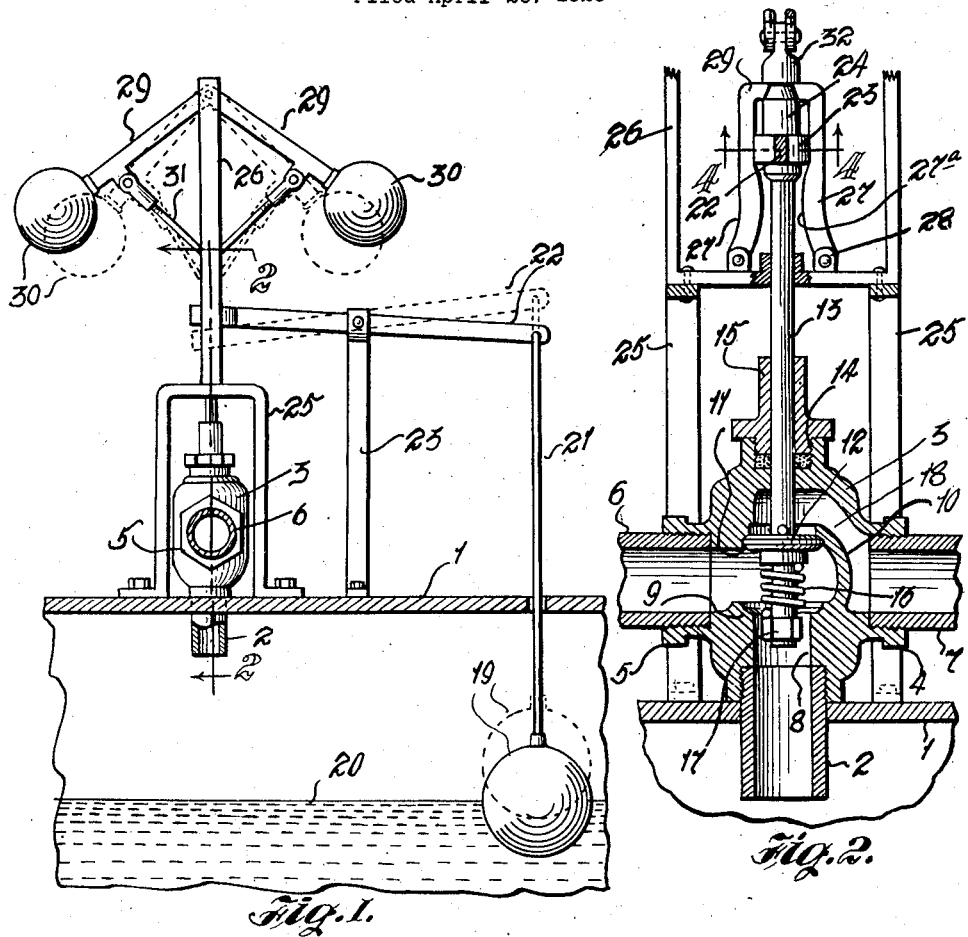
Figure 1 is a partial sectional view of an oil storage tank, illustrating an embodiment of the valve.
Figure 2 is an enlarged vertical sectional view through the valve and a portion of a tank.
Figure 3:
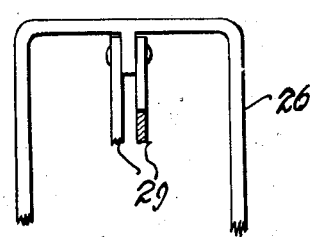
Figures 3 and 4 are detail views, Figure 4 being taken along line 4—4 of Figure 2.

Numerals being employed in a more detailed description of the drawing, 1 denotes an oil storage tank having a cylindrical member 2 secured in the opening as shown.

Threadedly secured to the member 2 is a valve body 3, and affixed to opposite ends 4 and 5 of the valve body are the ends of an oil pipe line 6 and 7. In the interior of the valve body is a port 8 having a seat 9 and adjacent this port the valve interior is partitioned at 10 and formed in the upper portion of the partition and the opposite side of the valve interior 11 is an upper seat for the valve 12. This valve is carried on a valve stem 13, traversing the upper end of the valve body and a packing ring 14, held in place by a cap 15. On the lower end of the valve stem is a spring 16 secured in position by a nut 17.

The partition 10 causes the oil to flow into the tank through pipe 6 through port 8, when the valve is in the position illustrated in Figure 2.

Formed in the interior of the body of the valve above the portion 10 is a passageway 18 which has communication with the pipe 7, and which communicates also with pipe 6 when the valve 12 is in the seat 9, which occurs when the tank has been filled.

Figure 4:
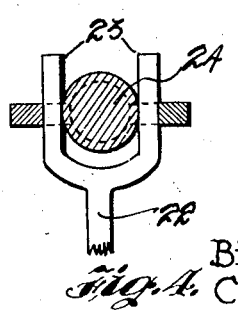

The means employed for automatically closing the valve is provided by a hollow air-tight ball 19 of well-known construction, the ball floating on the surface of the liquid 20. The ball has a rod 21, pivoted to a rod 22, the latter balanced centrally and pivoted to a support 23 in the tank. The opposite end of the rod 22 is forked, the two prongs 23 straddling an enlarged portion 24 of the stem 13 in the manner shown in Figure 4. The valve body is provided with a frame consisting of a base including two U-shaped members 25 secured to the tank, and an upper frame member 26 resting upon and secured to the members 25. Through the frame member 26 the stem 13 is passed to retain the stem in vertically-aligned position with the valve body and to guide the stem between the two dogs 27. These dogs are pivoted at their lower ends at 28 to the frame member 26 and are bent over at their upper ends 29 and bevelled to conformably engage the annularly-notched upper end of the enlarged portion 24 of the stem. The dogs have inwardly curved portions 27ᵃ.

Pivoted to the top portion of the frame member 26 are two rods 29 carrying on their free ends weighted balls 30. Adjacent the balls and pivoted to the lower end of the rods 29 are pins 31. These pins are pivoted to the extreme end 32 of the enlarged stem portion 24.

The valve is opened for admission of oil through valve port 8 by lifting the weighted balls 30 by hand and placing the dogs in the annular notch in the upper end of the stem. When the oil has reached the top of the tank and come into contact with the ball 19, the pressure forces the inner end of the lever 22 downward. This movement forces the dogs apart by the prongs 23 coming in contact with the curved portions 27ᵃ and relieves the weight of the balls 30, causing the stem to be forced downwardly thus seating the valve 12 in the seat 9. The oil flow is now diverted and flows through the passageway 18 to the next tank.

Obviously minor changes may be made in the construction of the invention in keeping with the appended claims.

What is claimed is:

1. An automatic valve for oil tanks, comprising a valve body including a valve with a stem and frame means for supporting the stem; means for tripping said stem to close the valve, including a hollow air-tight ball with rods pivotally connecting said ball with said stem; an annular notch in the stem; a plurality of dogs pivoted to said frame means and co-operating with said notch; weights having rods, the rods co-operating with said stem; said ball moving upward on rise of liquid in said tank and releasing said dogs from said stem, causing the stem to fall by reason of the weights to close the valve.

2. An automatic valve for oil tanks; comprising a valve assembly, including a valve with a stem, and a frame for supporting said valve stem; means for tripping said valve including a hollow air-tight ball, with rods pivotally connecting same with said stem, and dogs; a frame, weights pivoted to the frame, at the upper end of the rod and including pins connected with the stem; an annular notch in the stem; said ball arranged to move upward when the liquid in the tank comes in contact with the ball and by means of the rods in communication with the ball, releasing said dogs from engagement with the notch in said stem, the weights then descending and actuating the stem to close the valve.

In testimony whereof we affix our signatures.

BIGE GREGORY.
CLARENCE C. MITCHELL.